United States Patent Office 2,829,168
Patented Apr. 1, 1958

2,829,168

LIQUID-PHASE CRACKING METHYL ISOPROPENYL KETONE DIMER TO METHYL ISOPROPENYL KETONE

Fred J. Lowes, Midland, Mich., assignor to The Dow Chemical Company, Midland, Mich., a corporation of Delaware No Drawing. Application April 6, 1956
Serial No. 576,530

4 Claims. (Cl. 260—593)

This invention relates to the liquid phase cracking of methyl isopropenyl ketone dimer and the recovery of methyl isopropenyl ketone monomer therefrom. More particularly, it relates to a process for the catalytic cracking of methyl isopropenyl ketone dimer in the liquid phase and the distillative recovery therefrom of methyl isopropenyl ketone monomer.

In the preparation and storage of methyl isopropenyl ketone, substantial proportions of methyl isopropenyl ketone dimer are formed which presently have no value. Methyl isopropenyl ketone, on the other hand, is of considerable value in the preparation of polymeric products. Until the present time, no satisfactory method of recovering monomeric methyl isopropenyl ketone from its dimer has been known. Heating up to a temperature at which material distils results merely in the distillation of unchanged dimer. At still higher temperatures, distillation and/or decomposition and cracking to give an uneconomic amount of monomer occur, depending upon how high above its boiling point the dimer is heated.

In accordance with this invention, it has now been discovered that methyl isopropenyl ketone dimer can be cracked to yield monomer by fractionally distilling it in the presence of a catalytic amount of a cracking catalyst such as a Pt group metal, activated $Al_2O_3$, activated Ni and the like.

The amount of catalyst used is not critical. Traces are operable. Larger amounts than traces have no improved effect on yield of monomer.

The pot or still temperature is advantageously kept approximately at the boiling point of the dimer, about 196° to 198° C., and the head of the column is kept approximately at the boiling point of the monomer, about 96° C. Five theoretical plates suffice for the separation of monomer from dimer. Unreacted dimer can be collected and reprocessed.

Since there is some controversy as to the structure of methyl isopropenyl ketone dimer, what is meant by methyl isopropenyl dimer in this application is the compound having a molecular weight of 168.2, a boiling point of 142° C. at 160 mm. of Hg, an empirical formula of $C_{10}H_{16}O_2$ and produced by thermal dimerization of methyl isopropenyl ketone.

The following experiments represent preferred embodiments of this invention.

*Example 1*

Methyl isopropenyl ketone dimer, 300 grams, and 5% Pd on charcoal, 0.1 gram, were introduced into a 500 ml. round-bottomed flask and distilled through a 5-plate bubble-cap column. The pot temperature was 198° C. while the head temperature was 96° C. The overhead, 273 grams, was methyl isopropenyl ketone as determined by infra-red analysis. Column holdup amounted to 9 grams and residue amounted to 15 grams, which were determined to contain 15 percent methyl isopropenyl ketone and 85 percent methyl isopropenyl ketone dimer.

*Example 2*

Methyl isopropenyl ketone dimer, 300 grams, and 8-mesh $Al_2O_3$, 1 gram, were introduced into a 500 ml. round-bottomed flask and distilled at a maximum rate of 18 mls. per hour. Any increase in rate caused the head temperature to rise. The overhead, methyl isopropenyl ketone, amounted to 83 grams. Column holdup was 15 grams and pot residue was 200 grams, which were determined to contain 8 percent methyl isopropenyl ketone and 92 percent methyl isopropenyl ketone dimer.

What is claimed is:

1. A process for converting methyl isopropenyl ketone dimer to methyl isopropenyl ketone monomer and recovering said monomer which comprises heating said dimer to its boiling point in the presence of a catalytic amount of a cracking catalyst and fractionally distilling the resulting vapors, the head temperature of the fractionating column being at about the boiling point of said monomer.

2. A process as in claim 1 in which an activated $Al_2O_3$ catalyst is used.

3. A process as in claim 1 in which a palladium catalyst is used.

4. A process as in claim 1 in which a platinum group metal catalyst is used.

References Cited in the file of this patent

UNITED STATES PATENTS 2,577,445    Bortnick _____ Dec. 4, 1951